United States Patent [19]

Fernström

[11] Patent Number: 4,809,358

[45] Date of Patent: Feb. 28, 1989

[54] DEVICE FOR INFORMATION TRANSFERRING IN A TRANSPARENT SUBSTRATE BETWEEN COMPONENTS HAVING I/O ELEMENTS ARRANGED FOR COMMUNICATION DIRECTLY THROUGH THE SUBSTRATE BY DIRECTIVE RADIATION PROPAGATING LINEARLY WITHOUT REFLECTION AT SURFACES OF THE SUBSTRATE

[75] Inventor: Mikael Fernström, Göteborg, Sweden

[73] Assignee: Svenska Robot/Swedish Robot HB, Goteborg, Sweden

[21] Appl. No.: 108,825

[22] PCT Filed: Feb. 4, 1987

[86] PCT No.: PCT/SE87/00051

§ 371 Date: Oct. 6, 1987

§ 102(e) Date: Oct. 6, 1987

[87] PCT Pub. No.: WO87/05120

PCT Pub. Date: Aug. 27, 1987

[30] Foreign Application Priority Data

Feb. 14, 1986 [SE] Sweden .............................. 8600065

[51] Int. Cl.⁴ .............................................. H04B 9/00
[52] U.S. Cl. ................... 455/600; 350/96.11; 370/4; 455/607
[58] Field of Search ............... 455/600, 606, 607, 609, 455/610, 612, 613, 617, 619; 370/1, 4; 350/96.11, 96.28, 276 R, 276 SL; 250/239

[56] References Cited

U.S. PATENT DOCUMENTS 4,079,404  3/1978  Comerford ..................... 350/96.11
4,136,928  1/1979  Logan ............................ 350/96.11
4,499,806  2/1985  Broockman ..................... 455/607

FOREIGN PATENT DOCUMENTS 0063626    3/1982  European Pat. Off. .
58-225746  6/1982  Japan .
0028240    2/1986  Japan ............................. 455/600
0148405    7/1986  Japan ............................. 350/96.11
0290409   12/1986  Japan ............................. 350/96.11
85/03179   7/1985  PCT Int'l Appl. .
2150382    6/1985  United Kingdom ........... 455/612
2162336    1/1986  United Kingdom .

OTHER PUBLICATIONS

Balliet et al., "Optical Transmission System for Interconnecting Electronic Units", IBM Tech., vol. 26, No. 4, Sep. 1983, pp. 1793–1796.

IBM Technical Disclosure Bulletin, vol. 8, No. 8, pp. 3532–3534, Jan. 1986.

Primary Examiner—Robert L. Griffin
Assistant Examiner—L. Van Beek
Attorney, Agent, or Firm—Holman & Stern

[57] ABSTRACT

A device for providing information transferring communication between circuits (11), for instance, IC circuits on a substrate (10) by using coherent radiation. The substrate is formed from a material that is transparent to the radiation. The edge sides of the substrate not actively used for transfer of information are coated by a radiation absorbing or reflection preventing material. The circuits are placed in exactly defined positions (12), with at least portions thereof inside the substrate. These portions of the circuits are provided with input and output elements respectively (17, 16) which respond to the radiation, and which input and output elements are, by virtue of the positioning of the circuits, arranged for communication by direct linear propagation of the radiation through the substrate material without reflection at surfaces of the substrate.

6 Claims, 2 Drawing Sheets

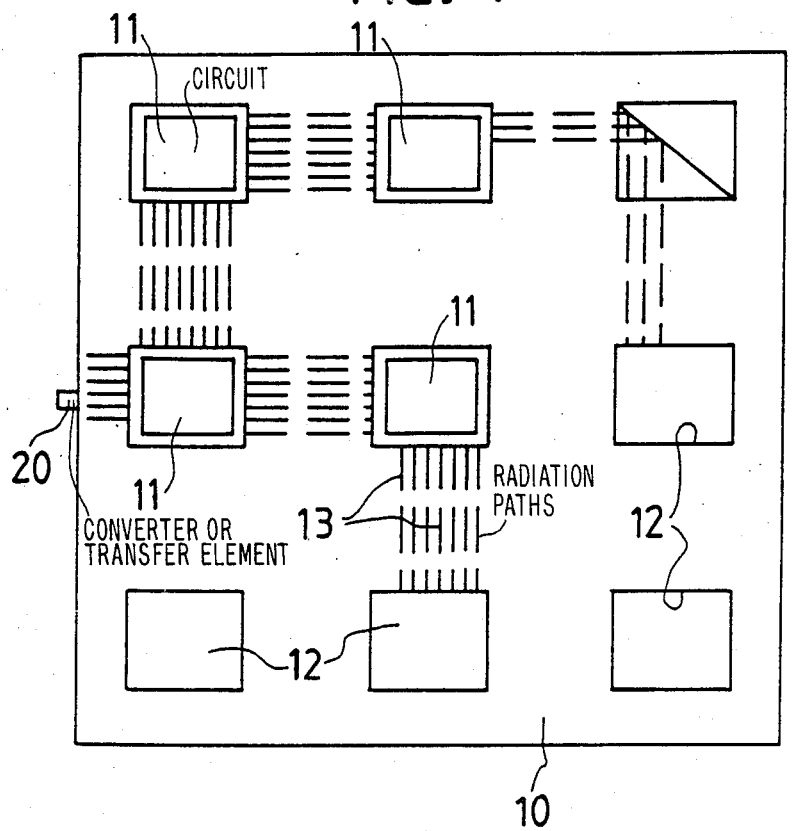
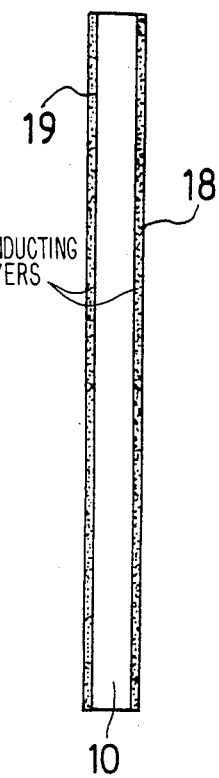
FIG. 1
FIG. 4
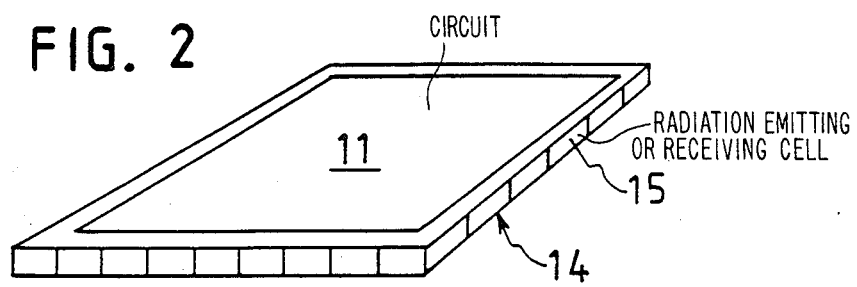
FIG. 2

DEVICE FOR INFORMATION TRANSFERRING IN A TRANSPARENT SUBSTRATE BETWEEN COMPONENTS HAVING I/O ELEMENTS ARRANGED FOR COMMUNICATION DIRECTLY THROUGH THE SUBSTRATE BY DIRECTIVE RADIATION PROPAGATING LINEARLY WITHOUT REFLECTION AT SURFACES OF THE SUBSTRATE

CROSS REFERENCE TO RELATED APPLICATION(S)

This U.S. application stems from PCT International Application No. PCT/SE87/00051 filed Feb. 4, 1987.

BACKGROUND AND SUMMARY OF THE INVENTION

The present invention relates to a device for the transfer of information between electric components or circuits, for instance LSI-circuits, on a substrate by utilizing a directive or directivable narrow spectrum radiation, for instance laser radiation.

The problem of the present invention is to simplify the prior art optics communication technique into a technique which is more simple and flexible than the prior art ones and, additionally, which is competitive from a cost point of view.

It is known to use a light of narrow spectrum or coherent light from a laser as an information carrier between electric circuits on a substrate. IBM Technical Disclosure Bulletin, Vol. 22, No. 8B, January 1980 for instance describes a system where optical light conductors are used for such light between two circuits.

However, very surprisingly, according to the present invention it has been found that such light has a considerably broader field of application. It has been found that, basically, there is no need to use a compulsory encasement in a light conduit, i.e. an optical fibre, instead the light may propagate freely within the substrate under certain conditions.

Thus, the invention provides a device for information transferring communication between components or circuits on a substrate by using directive, narrow spectrum radiation, for instance laser light, as an information transferring medium.

The device is characterized in that the substrate is formed from a material that is transparent for such radiation, that the components are placed in predetermined positions, at least partially within the transparent material, that the components in areas thereof lying inside said material are provided with input and output elements responsive to said radiation, and that said elements due to the location of said components are arranged to communicate by means of said radiation directly through the material of the substrate without reflection at the surfaces of the substrate.

In order to eliminate stray illumination inside the substrate and undesired reflection of radiation in the narrow edge sides of the substrate, the non-active portions thereof are covered or coated by a material that prevents or highly attenuates reflection of radiation, for instance painted dark.

In order to prevent an undesired interference between radiation inside the substrate, said input and output elements are placed such that parallel, co-existent rays of radiation are eliminated. As there are involved relatively short propagation distances; normally the substrate has a dimension not larger than A4-shape, the input and output elements may be packed relatively tight without any risk for said parallel co-existence.

Today there is available a well developed mechanic microtechnique which allows an accurate definition of position. The electrochemical and photografic semiconductor technique does also allow a very exact positioning of components and component parts of an electric circuit.

In one embodiment of the present invention such components are placed in well defined recesses in a broad side of a substrate, and at least someone of the narrow edge sides of the substrate has means for receiving or transmitting radiation from said output and input elements, respectively.

In order to provide a current supply to the electric circuits on the substrate the arrangement preferably is such that both broad sides of the substrate have external conductive surfaces which are electrically connectable to said components.

In order to further improve the flexibility, the input and output elements of the components or circuits are connected to a programmable arrangement of connection paths between elements of a respective component or circuit.

BRIEF DESCRIPTION OF THE DRAWINGS

The invention will now be exemplified by reference to the accompanying drawings, where FIG. 1 in a view from above shows a substrate according to the invention provided with circuits, FIG. 2 in a perspective view shows one of the electric circuits on/in the substrate.

DETAILED DESCRIPTION OF THE INVENTION

Figure 3:
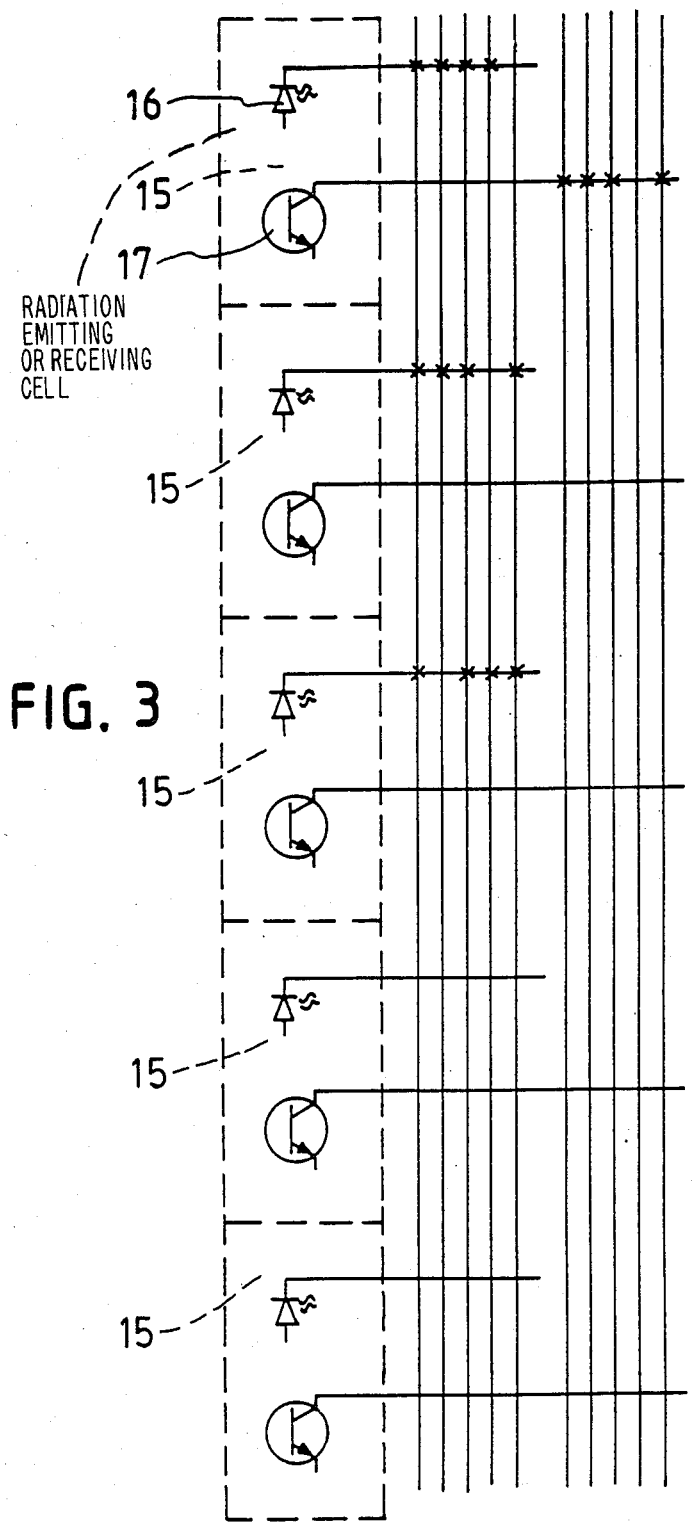
FIG. 3 shows a programmable arrangement of inputs and outputs to one edge side of the circuit in FIG. 2, and FIG. 4 in an end view shows the substrate according to FIG. 1 and a cover or coating for providing electric connection facilities for circuits on/in the substrate.

The substrate 10 in FIG. 1 may for instance comprise glass, plastics material which is shock resistant and of high strength, for instance polystyrene, possibly some curable plastics material or a similar one. The necessary condition is that the material is transparent to the actual narrow spectrum or coherent radiation that is used for information transfer between circuits 11 on/in the substrate. The type of radiation in the actual embodiment is radiation from so called laser diodes, i.e. diodes which when exitated radiate a coherent light of a specific wave length or within a very narrow spectral interval.

The circuits 11, which for instance are of the LSI-type, are recessed in the material of the substrate in very well defined and accurately positioned recesses 12 in the substrate. Said recesses are formed by using the high technology micromechanical technique that is available today, they are formed either when moulding or injection moulding the substrate or at a later processing stage. The broken lines 13 indicate the information transferring radiation path available in the substrate, between several circuits 11.

Along the edge sides 14 of individual circuits 11 without reflection at the surfaces of the substrate there are "cells" 15, each one containing a laser diode 16 and a photosensitive transistor 17. Each such cell may be programmed, for instance by PLA-technique, for being a radiation emitting or radiation receiving cell depending on whether the diode 16 or the phototransistor 17 is activated by the programming operation.

The portions of the free surface of each cell 15 which are not used actively for information transfer are coated by some radiation attenuating or reflection preventing material, for instance painted dark, for preventing stray radiation inside the substrate. The total surface of a substrate 10 normally is not larger than maximum an A4-page, meaning that active elements 16, 17 may be packed relatively close without risk for interference between the rays of radiation. To obtain interference there is necessary a co-existence in one and the same direction, in the three dimensional space as well as time, which will not be the case with the moderate radiation distances in the present context.

In the figures there have not been shown any crossing radiation paths, however, such an arrangement is basically possible.

In order to supply the circuits on/in the substrate with current there preferably are arranged electric conducting layers 18, 19 covering the entire two broad sides of the substrate, for instance as conductive coatings. Such layers form connectors to the electric DC-source normally used for energy supply to the circuits on the substrate.

Along the edge sides of the substrate there are the necessary number of converters 20 or transfer elements for transferring and/or processing output signals from the several circuits on the substrate.

I claim:

1. A device for information transferring communication between components or circuits on a substrate by using directive, narrow spectrum radiation as an information transferring medium, where the substrate (10) is formed of a material that is transparent to said radiation, the components (11) are placed in predetermined positions at least partially inside the transparent material, and components in regions thereof lying inside said material are provided with input and output elements (17 and 16, respectively) responsive to said radiation, characterized in that said input and output elements are arranged for communication directly through the material of the substrate by means of said radiation (13) which propagates linearly in the substrate material without reflection at surfaces of the substrate.

2. A device according to claim 1, characterized in that the surfaces of the substrate which are not actively used are coated by a radiation reflection attenuating material.

3. A device according to claim 2, characterized in that the said input and output elements (17, 16) are placed such that rays of radiation that are co-existent in space and time are avoided.

4. A device according to claim 3, characterized in that the components are placed in well defined recesses (12) in a broad side of the substrate, and that at least one narrow edge side of the substrate has means (17 and 16, respectively) for receiving or transmitting radiation from said output and input elements, respectively.

5. A device according to claim 2, characterized in that broad sides of the substrate externally are provided with electric conductive surfaces (18, 19), which are electrically connectable to said components.

6. A device according to claim 3, characterized in that the said input and output elements are connected to a programmable arrangement of connection paths between elements within a component or circuit.

* * * * *